UNITED STATES PATENT OFFICE.

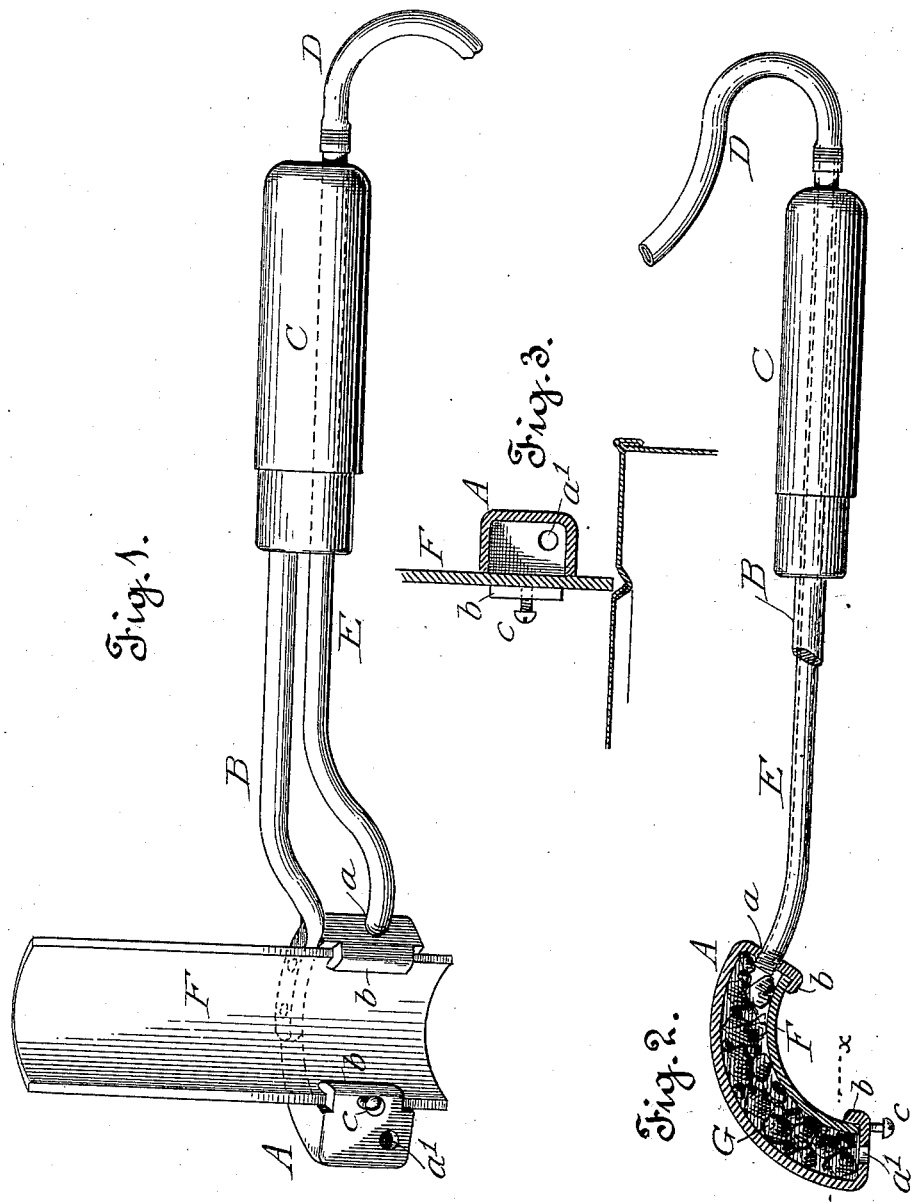

WILLIAM A. ROSE, OF SANTA ROSA, CALIFORNIA.

SOLDERING IMPLEMENT.

SPECIFICATION forming part of Letters Patent No. 668,320, dated February 19, 1901.

Application filed April 30, 1900. Serial No. 14,993. (No model.)

*To all whom it may concern:*

Be it known that I, WILLIAM A. ROSE, a citizen of the United States, residing at Santa Rosa, in the county of Sonoma and State of California, have invented certain new and useful Improvements in Soldering Implements, of which the following is a specification.

My invention relates to implements for soldering, by hand, the caps to the open ends of filled sheet-metal cans. Such an iron, however, is adapted to other uses; but I describe it here in its adaptation to the purpose for which it is now particularly intended. The irons commonly used for hand-soldering of this kind are large heavy masses of several pounds in weight forged to a working edge. The large amount of metal is required to retain the heat, since the irons are usually heated by external means. When the working edge becomes unfit for use, the mass must be reforged to a new edge, and in this way much time and labor are wasted. I have devised an iron capable of continuous use and with a constant working edge, which is provided also with means for internal heating and keeping heated.

My invention is illustrated in the accompanying drawings, in which—

Figure 1 is a perspective view. Fig. 2 is a horizontal section through the heating-chamber. Fig. 3 is a vertical cross-section on the line $x$ $x$ of Fig. 2.

A represents a hollow chamber, which for can-cap soldering I prefer to make of the segmental shape shown.

B represents a shank secured to the chamber and having a hollow non-conducting handle C. Entering this handle is a tube D, which is flexible and extends to any suitable source of gas or oil supply. A tube E, which may be a continuation of the tube D, connects the handle to a burner-hole $a$ in the chamber A. Any suitable nozzle or burner can be used within the chamber. Another hole $a'$ is formed in the opposite end of the chamber to permit the products of combustion to escape after heating the soldering-iron, as hereinafter described.

The front of the chamber A is entirely open, as shown in Fig. 3, and its front edges are formed into clips $b$. Held between these clips is a soldering-iron F, which for this form of soldering is a curved metal bar of uniform thickness throughout its length. This thickness should be such that the edge of the bar is of the proper size to act as a soldering-iron. The curvature of the bar conforms to that of the chamber and also to the curvature of standard sizes of can-caps. When in proper position for operation, as shown in the drawings, the lower edge of the bar projects a short distance below the bottom of the chamber, and the bar itself is held in place by set-screws, which pass through the chamber and rest against the edge of the bar. One of such set-screws (shown at $c$) is sufficient to hold the soldering-bar rigidly in place. When this screw is loosened, the bar can be adjusted vertically in the chamber and can be continuously used until it is entirely worn out. It will be seen that the shortening of the bar produced by wear always leaves a good working edge of the proper thickness, and hence that the necessity which has heretofore existed of reforging an edge on such bars is done away with. Further, the curved bar of uniform thickness shown is exceedingly light and easy to handle when compared with the bars formerly used in which a heavy mass of metal was required in order to retain heat. By my construction the lower part of the bar is directly exposed to the action of heat confined within the chamber, whose open side is closed by the bar itself.

I prefer to afford a resistance to the passage of heat through the chamber by providing it with a filling capable of being heated and of retaining heat, which filling shall be in direct contact with the soldering-bar. This makes a more efficient heating agency than a jet of flame alone directed into the chamber. For such filling I can use any suitable material; but in practice I have used and prefer to use blocks, fragments, or pieces of hard carbon G. Such material quickly becomes heated and retains its heat, and as it is disposed in the chamber in contact with the soldering-tool it communicates constant heat to the latter.

The curved bar shown is particularly adapted for soldering caps upon open can-heads, but is illustrative of other forms and shapes of soldering-bars which may be used in other classes of soldering in connection with such a heating-chamber as I have described. I do not limit myself, therefore, to the particular shape of bar nor to the exact details of construction or arrangement herein described or shown in the drawings, as I desire to avail myself of such modifications and equivalents as fall properly within the spirit of my invention.

Having thus fully described my invention, what I claim as new, and desire to secure by Letters Patent, is—

1. A soldering implement comprising a heating-chamber and burner, a soldering-bar mounted upon said chamber, and a filling of material within the chamber adapted to absorb and communicate heat.

2. A soldering implement comprising an open-sided heating-chamber and burner, a soldering-bar mounted upon said chamber so as to close its open side, and a filling of material within the chamber adapted to absorb and communicate heat.

3. A soldering implement comprising a heating-chamber and burner, a soldering-bar mounted upon said chamber, and a filling of carbon within the chamber adapted to absorb and communicate heat.

4. A soldering implement comprising a chamber having an open front, means for adjustably holding a soldering-bar so as to close said open front, an adjustable soldering-bar of uniform thickness, a handle having a solid shank secured to said chamber, a passage through said handle, and a tube connecting said passage with the interior of the said chamber.

In testimony whereof I have affixed my signature, in presence of two witnesses, this 9th day of April, 1900.

WILLIAM A. ROSE.

Witnesses:
S. B. CLAYPOOL,
PAT KEATING.